United States Patent [19]
Berglund et al.

[11] Patent Number: 5,675,250
[45] Date of Patent: Oct. 7, 1997

[54] ANGULAR POSITION SENSOR HAVING NO PHYSICAL ELECTRICAL CONTACT BETWEEN A ROTATING PORTION AND A STATIONARY PORTION OF THE SENSOR

[75] Inventors: Darrel W. Berglund, Peoria; Timothy A. Boston, Tremont; Zachary A. Kauk, Decatur, all of Ill.

[73] Assignee: Caterpillar Inc., Peoria, Ill.

[21] Appl. No.: 431,700

[22] Filed: Apr. 28, 1995

[51] Int. Cl.⁶ ..................... G01B 7/30
[52] U.S. Cl. ............... 324/207.25; 324/207.2; 338/32 H
[58] Field of Search ............ 324/207.2, 207.26, 324/251, 252, 260, 262, 174, 166; 338/32 R, 32 H

[56] References Cited

U.S. PATENT DOCUMENTS

| | | | |
|---|---|---|---|
| 3,993,946 | 11/1976 | Makino | 324/207.21 |
| 4,283,679 | 8/1981 | Ito et al. | 324/207.25 |
| 4,754,221 | 6/1988 | Ao et al. | 324/207.21 |
| 4,779,075 | 10/1988 | Zagelein et al. | 324/207.24 |
| 4,987,879 | 1/1991 | Chi et al. | 324/207.25 |
| 5,122,741 | 6/1992 | Ohsumi | 324/207.25 |

FOREIGN PATENT DOCUMENTS

| | | | |
|---|---|---|---|
| 04219907 | 12/1993 | Germany | 324/207.25 |
| 0173969 | 7/1988 | Japan | 324/207.25 |
| 404002914 | 1/1992 | Japan | 324/207.25 |

*Primary Examiner*—Sandra L. O'Shea
*Assistant Examiner*—Jay M. Patidar
*Attorney, Agent, or Firm*—R. Carl Wilbur

[57] ABSTRACT

An apparatus is provided for sensing an angular position of a shaft or other rotatable body. The apparatus preferably includes a first and second housing portion. A circuit connected to a circuit board is housed in the housing and includes a plurality of proximity sensors. A rotatable member is rotatably attached to the circuit board and includes a position indicator. The circuit produces a signal as a function of the position of the rotatable member.

4 Claims, 2 Drawing Sheets

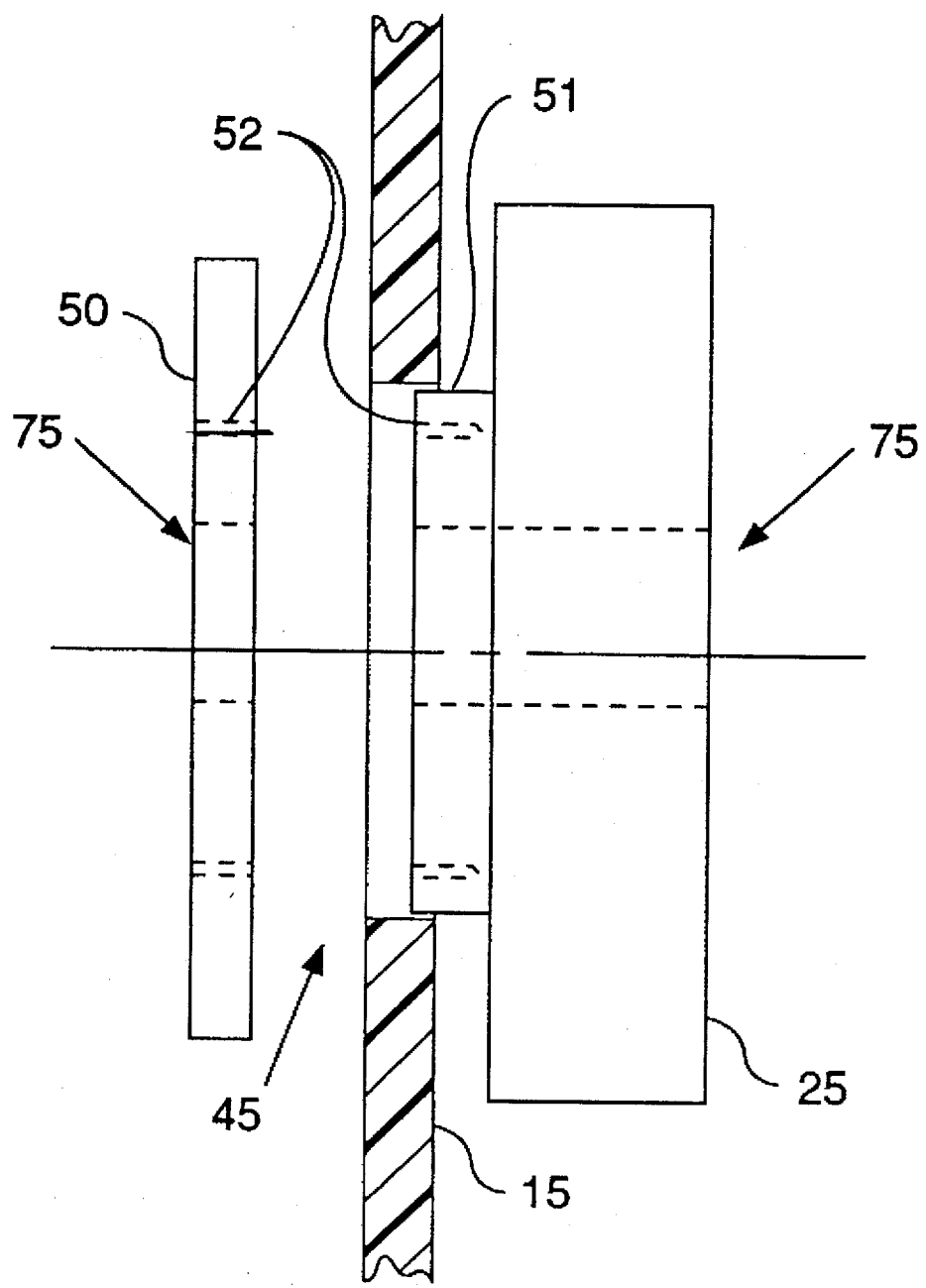

ANGULAR POSITION SENSOR HAVING NO PHYSICAL ELECTRICAL CONTACT BETWEEN A ROTATING PORTION AND A STATIONARY PORTION OF THE SENSOR

TECHNICAL FIELD OF THE INVENTION

The present invention relates to rotary position sensors, and more particularly to rotary position sensors without physical electrical contacts between a rotating portion and a stationary portion of the sensor.

BACKGROUND OF THE INVENTION

Rotary position sensors that measure an angular position of a shaft are known. Typically, such sensors include a wiper that is installed on a rotating portion and a contact or set of contacts that form an arc or circle on a stationary portion of the sensor. For example, such a sensor is disclosed in U.S. Pat. No. 4,915,075, issued to Brown et. al.

In instances where a rotary sensor must sense between a plurality of discrete angular positions, discrete contact pads are oftentimes arranged in a circle or a semi-circle. As the wiper crosses an individual pad it creates an electrical contact, which permits the sensor to output a signal that is a function of the wiper position. Since the wiper rotation is normally dependent on the rotation of a shaft, or other object whose rotational position is to be measured, the position of the wiper is, in turn, a function of the position of the shaft. In this manner, the sensor outputs a signal that is a function of the rotational position of the shaft.

One particular application for rotary sensors is in vehicle transmissions. In some transmission applications, it is desirable to have an actual transmission gear ratio signal. That signal is used by a transmission controller. A rotary sensor is particularly well adapted for theses applications. However, because transmission shifts occur frequently, known rotary sensors using discrete contact pads and electrical wipers are subject to failure because of wear.

Although these systems work satisfactorily for a period of time, they eventually wear out because of the direct physical contact between the wiper and the contact pads. It would be preferable to utilize a sensor that could sense rotary position without a physical electrical connection between a wiper and a contact pad.

SUMMARY OF THE INVENTION

One aspect of the present invention includes a stationary circuit board having a rotational member rotatably mounted thereto. Arranged on the circuit board are a plurality of proximity sensors. A position indicating means is attached to the rotational member and passes adjacent to the proximity sensors as the rotational member rotates. A circuit connected to said plurality of proximity sensors detects when said position indicating means is adjacent one of said plurality of proximity sensors and produces a signal indicative of the position of said position indicating means.

Another aspect of the present invention includes a method of using a sensor to sense the angular position of a shaft. The sensor includes a rotational member rotatably attached to a stationary circuit board. A plurality of proximity sensors are installed on said stationary circuit board and a magnet is attached to said rotational member. The magnet passes adjacent to the proximity sensors as the rotational member rotates. The method includes the steps of rotating the shaft, rotating the rotational member in response to rotating the shaft, sensing the proximity of the magnet to a proximity sensor, and producing a proximity signal as a function of said step of sensing wherein the proximity signal is a function of the position of the shaft.

These and other aspects and advantages of the present invention will become apparent upon reading the detailed description of the preferred embodiment in conjunction with the drawings and appended claims.

BRIEF DESCRIPTION OF THE DRAWINGS

FIG. 2 is a cross sectional view of the rotation connection between the rotational member and the circuit board.

DETAILED DESCRIPTION OF THE PREFERRED EMBODIMENT

Figure 1:
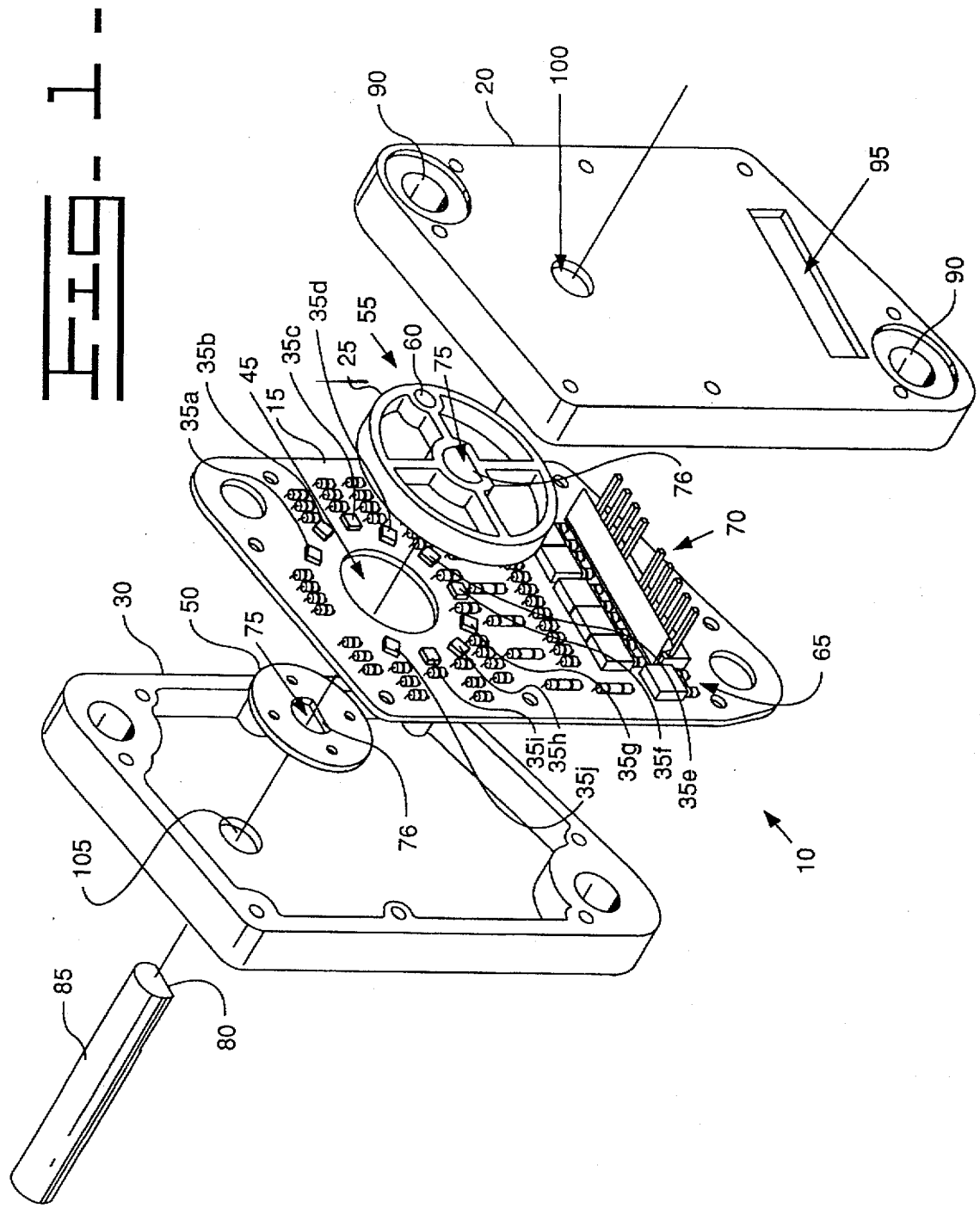
FIG. 1 is an exploded isometric view of a preferred embodiment of the angular position sensor of the present invention.

Referring to FIG. 1, a preferred embodiment of the contactless angular position sensor 10 of the present invention is shown. The sensor 10 preferably includes a stationary circuit board 15, a first housing portion 20, a rotational member 25, and a second housing portion 30.

Included on the stationary circuit board 15 are a plurality of proximity sensors 35a–j, which sense the proximity of a magnet. In a preferred embodiment, there are ten proximity sensors 35a–j, which include a hall effect sensor and are fixed to the stationary circuit board 15 in a semi-circular arrangement about a rotational member opening 45. Although the preferred embodiment described herein includes ten proximity sensors 35a–j, it should be recognized that one skilled in the art could readily and easily vary the number of such sensors without deviating from the scope of the present invention as defined by the appended claims.

The rotational member 25 is rotatably attached to the stationary circuit board 15. In a preferred embodiment the rotational member 25 includes a hub 51 (As shown in FIG. 2) that extends through the stationary board rotational member opening 45. A fastening member 50 is fixed to the hub to permit rotation of the rotational member 25 in a plane parallel to the plane formed by the stationary circuit board 15, while restricting motion perpendicular to that plane.

The rotational member is rotatably attached to the circuit board by inserting the hub 51 through the opening 45. A fastening member 50 is then connected to the hub 51 to prevent it from being withdrawn from the opening 45. As a result, the hub 51 and rotational member 25 can rotate but is restricted in other motion. FIG. 2 more clearly shows this relationship.

As can be seen in FIG. 2, the hub 51 is inserted through the stationary board rotational member opening 45 thereby permitting rotation of the rotational member, but restricting axial motion and also motion in the plane perpendicular to the circuit board 15. The fastening member 50 can be attached to the hub 51 in any conventional manner. In a preferred embodiment, the fastening member 50 is attached to the hub 51 using pins that are inserted and secured in fastening holes 52.

In a preferred embodiment, the rotational member 25 and the fastening member 50 include a shaft accepting opening 75 that includes a flat surface 76 which corresponds to a flat surface 80 on a shaft 85. The shaft 85 is inserted through the shaft accepting opening 75 of the rotational member 25 and the fastening member 50 so that the flat surface 80 of the shaft 85 engages the flat surfaces 76 of the shaft accepting openings 75. Rotation of the shaft 85 therefore produces a corresponding rotation of the rotational member 25 and fastening member 50. In this manner, the contactless angular position sensor 10 of the present invention measures the angular position of the shaft 85. Although in a preferred embodiment of the present invention a flat surface 76 in the shaft accepting opening 75 is used to transmit rotational movement of the shaft 85 into a rotational movement of the rotational member 25, other arrangements could be used to accomplish this without deviating from the spirit and scope of the present invention as defined by the appended claims.

Included on the rotational member 25 is a position indicating means 55. In a preferred embodiment, the position indicating means includes a magnet 60. As the rotational member 25 rotates, the magnet 60 passes adjacent one of the plurality of proximity sensors 35a–j. Each of the proximity sensors 35a–j is electrically connected to detection circuitry 65. The detection circuitry produces a proximity signal that is a function of the position of the magnet 60 in relation to one of the plurality of proximity sensors 35a–j. The proximity signal is transmitted to other devices via an electrical pin connector 70.

In a preferred embodiment shown in FIG. 1, the stationary circuit board 15, fastening member 50 and rotational member 25 are enclosed between the first housing portion 20 and the second housing portion 30. The first and second housing portions 20, 30 are drawn into contact with the stationary circuit board using fastening members such as screws or bolts (not shown) which are placed through fastening holes 90. The first housing portion 20 preferably includes an electrical pin connector opening 95, which provides access to the electrical pin connector 70 when the first housing portion 20 and the second housing portion 30 are drawn into contact with the stationary circuit board 15. The first and second housing portions also include a first shaft opening 100 and a second shaft opening 105, respectively. The first and second shaft openings 100, 105 provide means for permitting the shaft 85 to engage with the rotational member 25 and the fastening member 50.

According to the foregoing description of a preferred embodiment of the present invention, a contactless sensor is provided that does not require physical contact between a wiper and a contact pad. As such, there is no physical wear caused by physical contact between the wiper and the contact pad and the present invention will more likely have a longer useful life.

In one application, the present invention may be used in connection with a transmission controller and a transmission. As is known to those skilled in the art, when a typical transmission controller calls for a gear change it applies electrical current to a solenoid. Typically, the transmission includes two such solenoids, one for upshifts and one for downshifts. As the gear ratio of the vehicle changes, a rotary spool rotates and a shaft 85, such as the one shown in FIG. 1, moves to a position corresponding to the position of the rotary spool. The contactless position sensor of the present invention is thereby able to sense the actual gear ratio by sensing the position of the shaft 85. The position of the shaft is an output from the electrical pin connector 70. The electrical pin connector 70 is connected to the transmission controller. By monitoring that signal, the transmission controller can verify that the actual gear ratio engaged by the transmission corresponds to the desired gear ratio selected by the vehicle operator.

We claim:

1. An apparatus for sensing angular position of a shaft, comprising:

a stationary circuit board;

a rotational member rotatably mounted to said circuit board and having a shaft accepting opening;

a shaft inserted in said shaft accepting opening such that rotation of said shaft causes a corresponding rotation of said rotational member;

a plurality of proximity sensors installed on said stationary circuit board;

a position indicating means attached to said rotational member for passing adjacent to said proximity sensors as the shaft rotates the rotational member;

circuit detection means connected to said plurality of proximity sensors for detecting when said position indicating means is adjacent one of said plurality of proximity sensors and producing a position signal indicative of the position of said shaft;

an electrical connector attached to said stationary circuit board and electrically connected to said circuit detection means, said electrical connector providing a means for electrically connecting said sensor to external circuitry; and a first housing portion having an electrical pin connector openings and a shaft opening;

a second housing portion having a shaft opening;

wherein said stationary circuit board is installed between said first and second housing portion such that the respective shaft openings align with the shaft accepting opening on said rotational member and said electrical pin connector is accessible through said electrical connector opening on said first housing portion; and wherein said rotational member is rotatably attached to said stationary circuit board through a rotational member opening and secured with a fastening member;

wherein said rotational member includes a shaft accepting opening;

wherein said fastening member includes a shaft accepting opening;

wherein said shaft accepting openings include a flat surface; and wherein said shaft includes a flat surface engageable with the flat surface of said rotational member shaft accepting opening and said fastening member shaft accepting opening.

2. The apparatus according to claim 1, wherein said proximity sensors are fixed to said stationary circuit board in a semi-circular position about a center of the rotational member opening.

3. The apparatus according to claim 2, wherein the angle between adjacent proximity sensors is approximately thirty degrees.

4. The apparatus according to claim 3, including ten proximity sensors.

* * * * *